United States Patent
Dinkel et al.

(10) Patent No.: US 6,877,822 B2
(45) Date of Patent: Apr. 12, 2005

(54) HYDRAULIC UNIT FOR ANTI-SLIP REGULATED BRAKING SYSTEMS

(75) Inventors: Dieter Dinkel, Schwalbach (DE); Albrecht Otto, Schöneck (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/432,321

(22) PCT Filed: Nov. 2, 2001

(86) PCT No.: PCT/EP01/12675

§ 371 (c)(1),
(2), (4) Date: May 21, 2003

(87) PCT Pub. No.: WO02/42134

PCT Pub. Date: May 30, 2002

(65) Prior Publication Data

US 2004/0046446 A1 Mar. 11, 2004

(30) Foreign Application Priority Data

| Nov. 21, 2000 | (DE) | 100 57 821 |
| Jan. 10, 2001 | (DE) | 101 00 742 |
| Jun. 30, 2001 | (DE) | 101 31 757 |

(51) Int. Cl.$^7$ ................................................. B60T 8/36
(52) U.S. Cl. ............................ 303/119.3; 303/DIG. 10
(58) Field of Search .................... 303/113.1, 119.2, 303/119.3, DIG. 10; 137/884

(56) References Cited

U.S. PATENT DOCUMENTS

| 5,244,262 A | * | 9/1993 | Kehl et al. ................ 303/119.3 |
| 5,449,226 A | * | 9/1995 | Fujita et al. .............. 303/119.3 |
| 6,260,933 B1 | * | 7/2001 | Dinkel et al. ......... 303/DIG. 10 |
| 6,398,315 B1 | * | 6/2002 | Dinkel et al. ......... 303/DIG. 10 |
| 6,428,121 B1 | * | 8/2002 | Dinkel et al. ......... 303/DIG. 10 |

FOREIGN PATENT DOCUMENTS

| DE | 19712211 | 10/1998 | |
| DE | 19805843 | 5/1999 | |
| DE | 19958194 | 1/2001 | |
| WO | 9116220 | 10/1991 | |
| WO | WO 98/42552 A1 | * 10/1998 | ............. B60T/8/36 |

* cited by examiner

Primary Examiner—Thomas Williams
(74) Attorney, Agent, or Firm—Honigman, Miller, Schwartz & Cohn LLP

(57) ABSTRACT

A hydraulic unit whose inlet valves are arranged in valve accommodating bores of a first valve row which is spatially separated by way of a pump accommodating bore from a second valve row accommodating the outlet valves, wherein several valve accommodating bores of a third valve row remote from the pump accommodating bore open directly between the second valve row and the braking pressure generator ports into a first housing surface of the accommodating member, and wherein an electric change-over valve closed in its basic position is provided in at least one valve accommodating bore of the third valve row for the hydraulic communication between at least one braking pressure generator port and a suction-side connection of the pump accommodating bore, the hydraulic communication between said changeover valve and the pump accommodating bore being established by way of a portion of a suction channel, the length thereof being determined by the distance between the pump accommodating bore and the third valve row.

10 Claims, 4 Drawing Sheets

HYDRAULIC UNIT FOR ANTI-SLIP REGULATED BRAKING SYSTEMS

TECHNICAL FIELD

The present invention generally relates to hydraulic control units and more particularly relates to a hydraulic unit for slip-controlled brake systems.

BACKGROUND OF THE INVENTION

German patent application DE 198 05 843 A1 discloses a hydraulic unit for a slip-controlled brake system comprising a block-shaped accommodating member which has eight valve accommodating bores in total, arranged side by side in a first and a second valve row, with electromagnetically operable inlet and outlet valves inserted in said bores. Outside the two valve rows are a pump accommodating bore and two parallel accumulator accommodating bores. The accumulator accommodating bores are arranged paraxially relative to the valve accommodating bores and laterally to the two valve rows, while the pump accommodating bore extends in parallel to the two valve rows. Disposed centrically between the two accumulator accommodating bores is a motor accommodating bore that extends paraxially relative to the accumulator accommodating bores into the pump accommodating bore. Further, there is provision of a third valve row which opens into the housing surface of the accommodating member at the other end thereof, remote from the braking pressure generator ports and the first and second valve rows. The third valve row, which is thus arranged directly adjacent to the two accumulator accommodating bores, ensures a simple functional extension of the hydraulic unit configured for anti-lock pressure control for the purpose of traction slip control or driving dynamics control. To this end, magnetic valves designed as electric change-over valves and closed in their initial position are inserted into the two external valve accommodating bores. Separating valves open in their initial position are inserted in the form of magnetic valves into the two intermediate valve accommodating bores of the third valve row.

The large distance between the braking pressure generator ports and the electric change-over valves, however, is disadvantageous because correspondingly long suction channels from the braking pressure generator via the electric change-over valves to the pump accommodating bore are necessary for the purpose of pressure fluid supply to the pump by way of the change-over valves. Inevitably, it is also complicated to evacuate the suction channels and to fill them with brake fluid, which is due to the high volume take-up. In addition, a correspondingly high hydraulic resistance is probable during pump operation. The necessary long suction channels can only be made by complicated drilling operations under aspects of manufacture.

In view of the above, an object of the present invention involves improving a hydraulic unit of the indicated type in such a way that the above-mentioned drawbacks are overcome.

BRIEF DESCRIPTION OF THE PREFERRED DRAWINGS

DETAILED DESCRIPTION OF THE PREFERRED EMBODIMENTS

Figure 1:
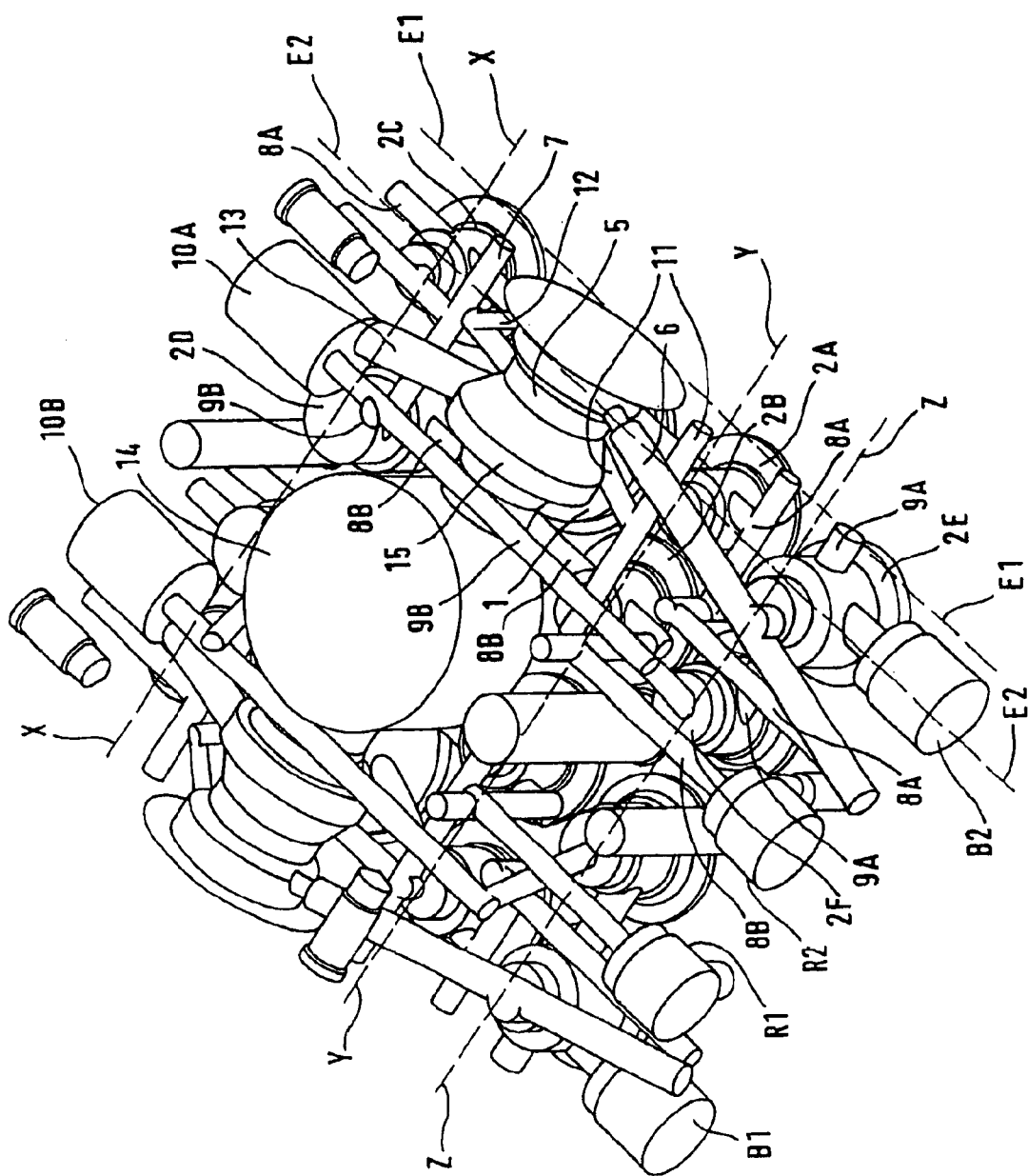
FIG. 1 is a three-dimensional illustration of a total view of the subject manner of the invention for exhibiting all accommodating bores and pressure fluid channels.

FIG. 1 is a three dimensional depiction of all pressure fluid channels, accommodating bores for valves, pump, and accumulator within the accommodating member 4. Electromagnetically operable inlet and outlet valves are inserted into several valve accommodating bores 2A, 2B, 2C, 2D of a first and second valve row X, Y, said valves extending from the direction of a first housing surface A1 of the accommodating member 4 vertically into the valve accommodating bores 2A, 2B, 2C, 2D. The first housing surface A1 is arranged at right angles relative to a second housing surface A2, opening into which are two braking pressure generator ports B1, B2 in the vicinity of the outside edges of the accommodating member 4, and this is due to the brake circuit having a two-circuit design. Between the two valve rows X, Y the accommodating member 4 incorporates a pump accommodating bore 5 that extends through the accommodating member 4 transversely to the direction the valve accommodating bores 2A, 2B, 2C, 2D open thereinto. On the third housing surface A3 disposed remote from the valve accommodating bores 2A, 2B, 2C, 2D, the accommodating member 4 includes a motor accommodating bore 14 which points vertically into the pump accommodating bore 5 at a point half the length of said pump accommodating bore 5. Further, an accumulator accommodating bore 1 is disposed between the first and second valve row X, Y on either side of the motor accommodating bore 14, said bore 1 being directed into the first housing surface A1 paraxially to the valve accommodating bores 2A, 2B, 2C, 2D.

Several valve accommodating bores 2E, 2F of a third valve row Z open remote from the pump accommodating bore 5 vertically into the first housing surface A1 of the accommodating member 4 directly between the second valve row Y and the braking pressure generator ports B1, B2. The third valve row Z includes both electromagnetically operable separating valves open in their basic position and electric change-over valves closed in their basic position. The chosen arrangement of the third valve row Z that includes the electromagnetic change-over valve permits an extremely short hydraulic connection between one braking pressure generator port B1 or B2, respectively, and a suction-side connection of the pump accommodating bore 5.

The suction conduit to the pump is basically determined by the distance between the centers of the pump accommodating bore 5 and the third valve row Z. This is advantageous because due to the short distances and dimensions between the braking pressure generator port B1 or B2 to the valve accommodating bore 2E housing the electric change-over valve, there is achieved a short suction channel 6 that directly opens into the pump accommodating bore 5 for the pressure fluid supply of the pump in the pump accommodating bore 5, said suction channel permitting low-cost manufacture and low-resistance fluid passage. The pressure-side outlet of the pump accommodating bore 5 opens into a noise damping chamber 10 that is arranged remote from the second and third valve row Y, Z vertically to the vertical plane of the first valve row X in the accommodating member 4.

It is apparent from FIG. 1 that a pressure fluid channel system is created by means of straight and cross bores between the individual valve rows X, Y, Z. Said channel system provides pressure fluid ports between the individual valve, pump and accumulator accommodating bores in conformity with the demands of performance, on the one hand, and can be realized as simply as possibly under manufacturing technique aspects, on the other hand.

The arrangement of the necessary pressure fluid channels in the accommodating member 4 for one of the two brake circuits will be explained in the following, namely between the braking pressure generator port B2 and the wheel brake port R2 that opens into the narrow housing surface A2 in parallel to the braking pressure generator port B1. The braking pressure generator port B2 in the lower housing plane of reference E1 leads into the valve accommodating bore 2E provided for an electric change-over valve and extending from a first supply channel 9A in the bottom housing plane of reference E1 in the direction of the valve accommodating bore 2F arranged beside the valve accommodating bore 2E and accommodating a separating valve. A second supply channel portion 9B designed as an angular channel extends from the valve accommodating bore 2F and is continued via the separating valve that is open in its initial position, transversely to the top into the top housing plane of reference E2 in the direction of the noise damping chamber 10A.

The second supply channel portion 9B consequently crosses the pump accommodating bore 5 in the direction of the first valve row X provided with several inlet valves. Shortly before the noise damping chamber 10A, a supply branch line 7 of the second supply channel portion 9B leads to the two valve accommodating bores 2C, 2D through which fluid flows in the direction of the housing plane of reference E1. From the valve accommodating bores 2C, 2D, each one pressure fluid connection continues as a wheel supply channel 8A, 8B in the bottom housing plane of reference E1 in the direction of the second valve row Y that accommodates the outlet valves being closed in their initial position. Thus, the wheel supply channels 8A, 8B cross below the pump accommodating bore 5 and are aligned in parallel to the second supply channel portion 9B up to the valve accommodating bores 2A, 2B of the second valve row Y. From there, e.g. the wheel supply channel 8B as an angular channel (that means as a channel bent at right angles) continues in the direction of the housing plane E2 to the wheel brake connection R2. The wheel supply channel 8A extends in a vertically downward direction to another wheel brake connection that is arranged on the bottom side of the accommodating member 4 and is essentially covered by the valve accommodating bore 2E. Therefore, the wheel supply channel 8A, after having crossed the first supply channel portion 9A, is deflected in a downward direction, while the wheel supply channel 8B that opens laterally into the valve accommodating bore 2B extends from the bottom housing plane of reference E1 to the top housing plane of reference E2 and from there crosses the valve accommodating bore 2F housing the separating valve in the direction of the wheel brake connection R2.

For the previously described course of the pressure channel between the braking pressure generator port B2 and e.g. the wheel brake connection R2, subsequently, the pressure fluid conduits will be explained for the operation of the hydraulic unit in the pressure maintaining phase and the pressure reduction phase exclusively for the pressure fluid supply of the wheel brake at the wheel brake connection R2.

In the pressure maintaining phase the inlet valve in the valve accommodating bore 2D switches into the closed position so that the hydraulic pressure in the second supply channel portion 9B is hindered to propagate into the supply branch line 7 and, thus, to the wheel brake connection R2. Consequently, the pressure in the wheel supply channel 8B remains constant. The pressure fluid supply via the supply branch line 7 to the valve accommodating bore 2C and the wheel supply channel 8A is not impaired by this provision.

When the objective is to reduce the pressure that prevails at the wheel brake connection R2, the outlet valve arranged in the valve accommodating bore B2 will switch into the open position, with the result that the pressure fluid that prevails in the wheel supply channel 8B propagates into the return channel 11 that is connected at the bottom 3 of the valve accommodating bore 2B and provides a communication between the two valve accommodating bores 2A, 2B of the second valve row Y. From there the return channel 11 extends as a transverse channel to an accumulator accommodating bore 1 that is located downstream of the pump accommodating bore 5 and houses a low-pressure accumulator piston.

A transverse channel 12 extends from the accumulator bore 1 and is continued in the space between the supply branch line 7 and the pump accommodating bore 5, opening into a pump pulsation damper integrated in the pump accommodating bore 5 in the present example. When the need for a pump pulsation damper is obviated, the supply branch line 7 extends directly into the pump accommodating bore 5. From the pump accommodating bore 5 the pressure fluid delivered by the pump is conducted to the noise damping chamber 10A via a pump pressure channel 13 that crosses the supply branch line 7.

The noise damping chamber 10A with its chamber bottom is additionally connected to the second supply channel portion 9B so that—in dependence on the valve switch position of the inlet valve inserted into the valve accommodating bore 2D—the pressure fluid discharged from the wheel brake R2 into the accumulator accommodating bore 1 is supplied to the wheel brake connection 2 again, if so required, and the pressure that prevails at the inlet valve will propagate via the second supply channel portion 9B, the open separating valve in the valve accommodating bore 2F, and the pressure supply channel 9 into the braking pressure generator port B2.

Figure 2:
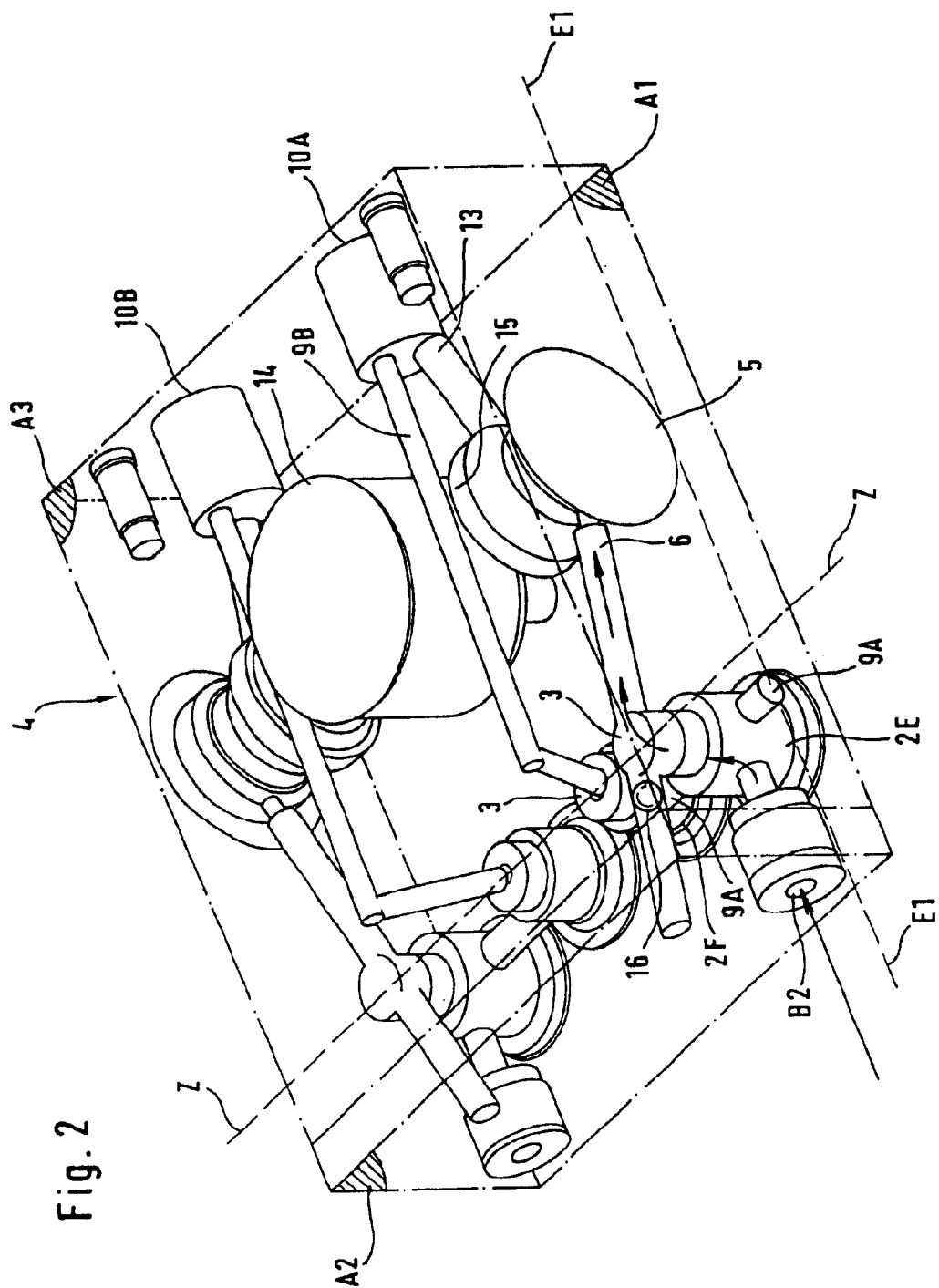
FIG. 2 is a detail view of FIG. 1 for explaining the features essential for the invention.

The perspective view of FIG. 2 shows the features being particularly significant for the idea of the invention and necessary to ensure a design of the accommodating member 4 that is optimized in terms of venting, filling and aspiration, without requiring modification of the pattern of connections known from the state of art in DE 198 05 843 A1 for the components of the brake system (e.g. motor, control unit, brake line) that are to be attached to the housing surfaces of the accommodating member 4. The following description of the details according to FIG. 2 thus represents a partial view of the hydraulic unit disclosed in FIG. 1.

In detail, FIG. 2 shows the block-shaped accommodating member 4, the third valve row Z including the valve accommodating bores 2E, 2F as well as the pump and motor accommodating bores 5, 14 and the noise damping chamber 10A, 10B for the hydraulic unit of the type described hereinabove. On the housing surface A2 remote from the noise damping chambers 10A, 10B, there are the two above-mentioned braking pressure generator ports B1, B2 for the brake line screw coupling to a dual-circuit master brake cylinder whose brake fluid is supplied for driving dynamics control to a pump arranged in the pump accommodating bore 5 by way of the suction channel 6 drafted exemplarily for a brake circuit portion. To this end, pressure fluid is conducted through a short channel portion of the braking pressure generator port B2 vertically into the valve accommodating bore 2E that houses the electric change-over valve.

In a driving dynamics control operation, the electric change-over valve adopts its open position so that the pressure fluid is directed from the horizontal line into the vertical line corresponding to the arrow shown within the valve accommodating bore 2E. The result is that the pressure fluid is conducted in the direction of the suction channel 6 arranged at the bottom 3 of the valve accommodating bore 2E, said channel crossing as a transverse bore the valve accommodating bore 2E from the direction of the second housing surface A2. The opening of the transverse bore disposed at the second housing surface A2 is closed by a plug or a ball so as to be pressure-fluid tight. The ball is press-fitted into the suction channel 6 as close as possible towards the valve accommodating bore 2E in order to minimize the clearance volume of the suction channel 6. The end of the suction channel 6 that is remote from the valve accommodating bore 2E opens into the pump accommodating bore 5.

An especially short, low-resistance suction conduit between the braking pressure generator port B2 and the pump accommodating bore 5 is favorably achieved due to the chosen position of the valve accommodating bore 2E. Thus, the suction channel 6 is easy to vent and to replenish. In addition, this arrangement permits aspirating the pressure fluid by way of the braking pressure generator port B2 on the shortest way from the pump in the pump accommodating bore 5 in a quick and reliable fashion. Corresponding to FIG. 2, the pump accommodating bore 5 on the suction side includes a pulsation-damping chamber and on the pump pressure side an additional noise-damping chamber 15 that is designed as an annular chamber and is integrated as a stepped bore in the pump accommodating bore 5. The pump pressure channel 13 is provided for the pressure-side connection of the pump accommodating bore 5 to the noise-damping chamber 10A, said pump pressure channel being directed equally as a transverse bore into the bottom of the cylinder-shaped noise damping chamber 10A which, inserted from outside into the accommodating member 4, is closed by a cover.

The second supply channel portion 9B that is known from FIG. 1 already crosses the pump accommodating bore 5 in the direction of the valve accommodating bore 2F accommodating the electric separating valve, so that the pressure fluid supplied from the pump bore 5 to the noise damping chamber 10A will escape in the noise damping chamber 10A in the direction of the second supply channel portion 9B and propagate up to the electromagnetically closed separating valve by way of the second supply channel portion 9B that opens into the bottom 3 of the valve accommodating bore 2F.

Figure 3:
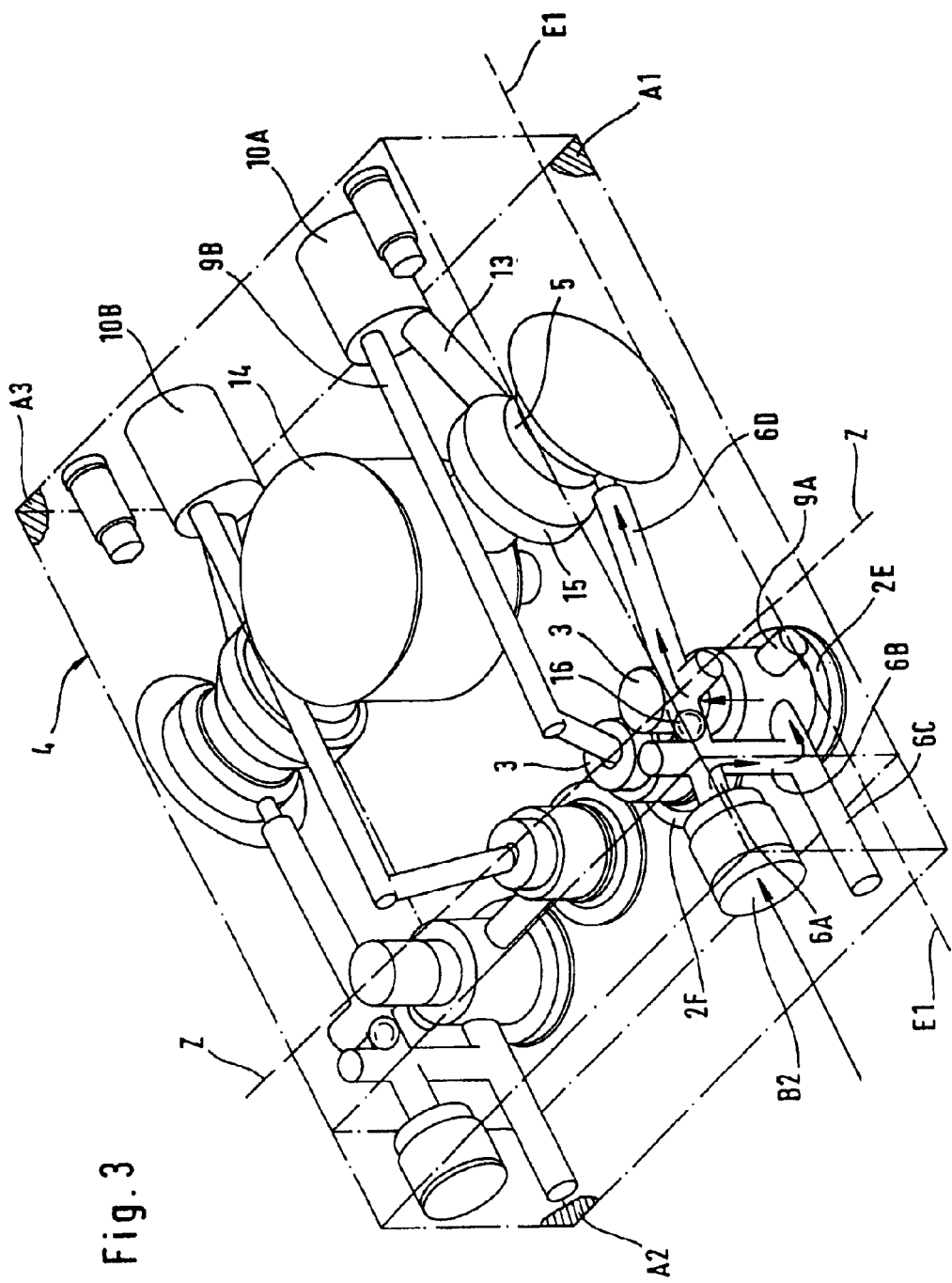
FIG. 3 is a variation of the subject matter of FIG. 2 in the area of the suction channel.

Different from FIG. 2, FIG. 3 shows an alternative of the arrangement of the suction conduit between the braking pressure generator port B2 and the pump accommodating bore 5 in the accommodating member 4. In this alternative, the braking pressure generator port B2 is disposed at the level of the transverse bore that penetrates the bottom 3 of the valve accommodating bore 2E, a closure member 16 configured as a ball being inserted into said transverse bore, with the result that the portion of the suction channel 6 that extends linearly in the transverse bore is subdivided into two portions 6A, 6D. Consequently, in direct adjacency to the braking pressure generator port B2 at the level of the housing plane E1 is the horizontally extending first portion 6A of the suction channel 6, following which is a second portion 6B pointing in a vertically downward direction towards the housing surface A1, said portion 6B being connected to a third portion 6C of the suction channel 6 that opens in a radial direction into the valve accommodating bore 2E of the electric change-over valve at the level of the housing plane E1.

In the open position of the electric change-over valve, there is thus a pressure fluid connection by way of the valve accommodating bore 2E to the fourth portion 6D of the suction channel 6 that extends from the bottom 3 of the valve accommodating bore 2E to the pump accommodating bore 5. The description of FIGS. 1 and 2 is referred to regarding the further pressure fluid conduits that can be seen in the drawing of FIG. 3. It becomes apparent from FIG. 3 that the closure member 16 is inserted into the portion of the transverse bore, which is interposed between the second portion 6B of the suction channel 6 and the valve accommodating bore 2E.

Figure 4:
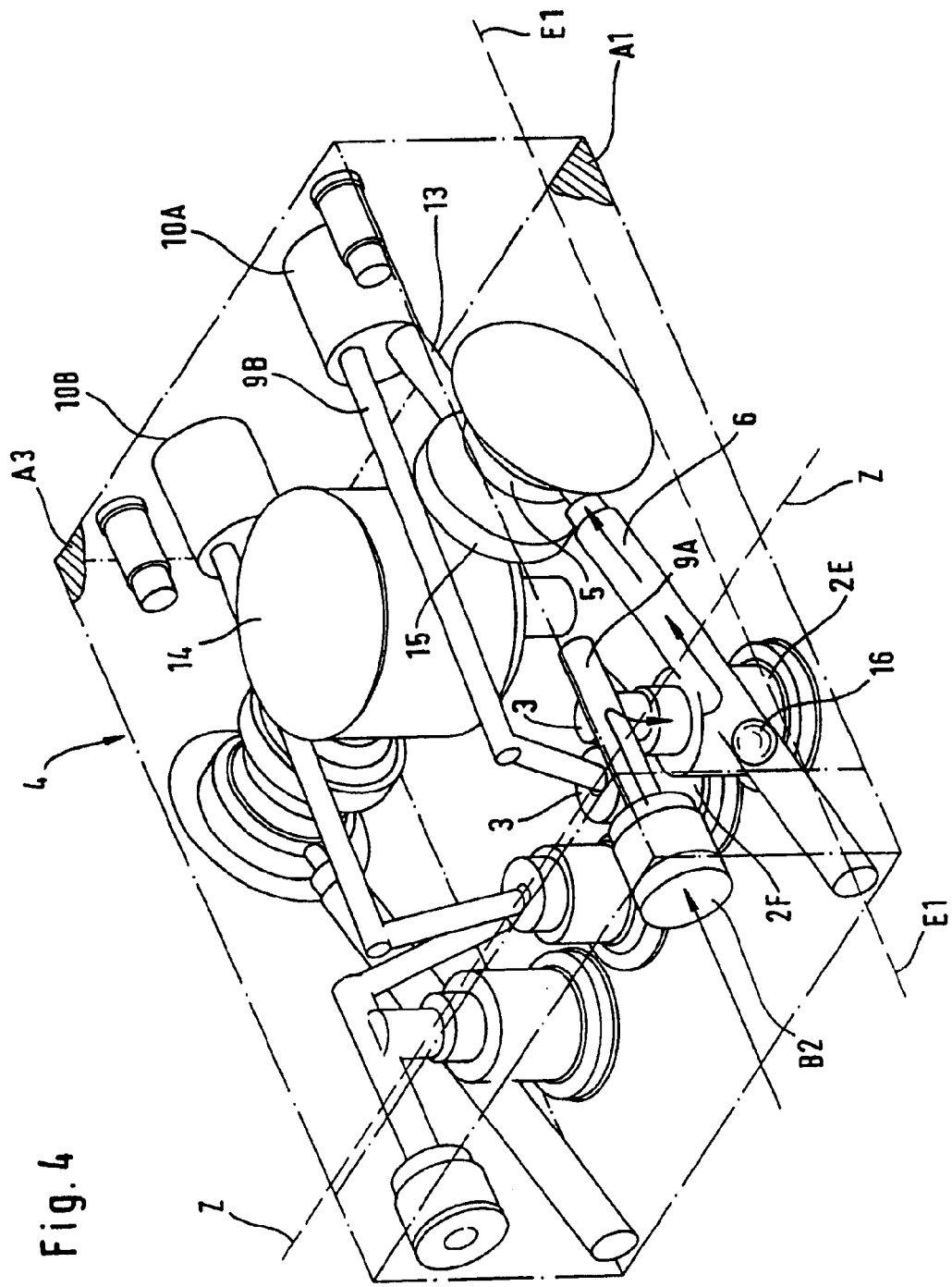
FIG. 4 is another embodiment for configuring the suction conduit between the braking pressure generator port and the pump accommodating bore in the accommodating member of the hydraulic unit.

In another embodiment of the subject matter of the invention according to FIG. 4, the valve accommodating bore 2E provided for the electric change-over valve is penetrated by fluid in opposite direction—what is in contrast to the illustrations in FIGS. 1, 2, and 3—so that the braking pressure generator port B2 opens into the bottom 3 of the valve accommodating bore 2E, and from there fluid flow takes place through the valve accommodating bore 2E in a vertically downward direction towards the housing plane E1, with the electric change-over valve open. In this bottom area of the valve accommodating bore 2E, a transverse bore having the function of the suction channel 6 from the direction of the housing surface A2 is tangent to the valve accommodating bore 2E in the direction of the pump accommodating bore 5, with the result that there is a short suction conduit for the pump between the valve accommodating bore 2E and the pump accommodating bore 5 succeeding which is the pump pressure channel 13 similar to FIGS. 1 to 3.

Thus, the channel arrangement (arrangement of bores in the block) in the accommodating member 4 presented by way of FIGS. 1 to 4 achieves a particularly simple, functionally improved hydraulic unit which provides optimal conditions in terms of ventilation ability, filling with brake fluid, and pressure fluid supply for the pump, without the need for modifications to the pattern of connections for the valves, the motor, and for the pressure fluid connections at the accommodating member 4 as known from the prior art in DE 198 05 843 A1. A shortest possible suction channel 6 is achieved by arranging the third valve row Z between the braking pressure generator ports B1, B2 and the pump accommodating bore 5.

What is claimed is:

1. Hydraulic unit for slip-controlled braking systems comprising:
   an accommodating member for accommodating inlet and outlet valves in several valve accommodating bores of a first and a second valve row, said inlet and outlet valves opening into a first housing surface of the accommodating member that is disposed at right angles to a second housing surface into which several braking pressure generator ports open,
   a pump accommodating bore arranged in the accommodating member, wherein said pump accommodating bore is directed transversely to the direction the valve accommodating bores, wherein the valve accommodating bores for the outlet valves are arranged in the second valve row that is directly adjacent to the pump accommodating bore, a motor accommodating bore arranged in the accommodating member and directed vertically to the pump accommodating bore, an accumulator accommodating bore opening arranged in the accommodating member, wherein the accumulator member includes several pressure fluid channels that connect the accommodating bores for the valve, the pump and the accumulator, wherein the several pressure fluid channels enable a hydraulic communication between a braking pressure generator and several wheel brakes, wherein the inlet valves are arranged in the valve accommodating bores of the first valve row which is spatially separated from the second valve row accommodating the outlet valves by the pump accommodating bore, wherein several valve accommodating bores of a third valve row remote from the pump accommodating bore open directly between the second valve row and the braking pressure generator ports into the first housing surface of the accommodating member, an electric change over valve for effecting hydraulic communication between at least one braking pressure generator port and a suction-side connection of the pump accommodating bore wherein said electric change-over valve is closed in its basic position in at least one valve accommodating bore of the third valve row, wherein the hydraulic communication between said changeover valve and the pump accommodating bore is established by way of a portion of a suction channel, the length thereof being determined by the distance between the pump accommodating bore and the third valve row, wherein a closure member is mounted into the suction channel as a transverse bore from the direction of the second housing surface in order to prevent a short-circuit current between a first and a fourth portion of the suction channel.

2. Hydraulic unit as claimed in claim 1, wherein a pressure-side outlet of the pump accommodating bore opens into a noise damping chamber that is arranged adjacent to the first valve row in the accommodating member remote from the second and third valve row.

3. Hydraulic unit as claimed in claim 1, wherein the valve accommodating bore of the third valve row accommodating the electric changeover valve is designed as a blind-end bore which extends from the direction of the first housing surface up to the bottom of the blind-end bore, which is crossed by the suction channel and is tangent thereto in the area of bottom, and wherein one of the braking pressure generator ports opens at a vertical distance from the bottom into the valve accommodating bore of the third valve row in such a manner that depending on the valve switch position of the electric change-over valve associated with the valve accommodating bore, there is a direct pressure fluid connection of the suction channel between the braking pressure generator port and the pump accommodating bore by way of the valve accommodating bore.

4. Hydraulic unit as claimed in claim 1, wherein the valve accommodating bore provided for the electric change-over valve is configured as a blind-end bore that extends from the direction of the first housing surface to the bottom of the blind-end bore, and in that in the area of the bottom the suction channel is continued linearly until the braking pressure generator port.

5. Hydraulic unit as claimed in claim 4, wherein a first and a fourth portion of the suction channel is produced by a drilling operation directed into the second housing surface, wherein said fourth portion of the suction channel extends up to the pump accommodating bore, wherein a second portion of the suction channel is produced by another drilling operation that is directed into a third housing surface disposed opposite the first housing surface, said second portion opening into the first portion of the suction channel produced by the first drilling operation, and wherein the second channel portion of the suction channel is interposed directly between the valve accommodating bore of the electric change-over valve and the braking pressure generator port.

6. Hydraulic unit as claimed in claim 5, further including a third channel portion that opens from the direction of the second housing surface into the valve accommodating bore of the electric change-over valve in parallel to the braking pressure generator port is introduced into the valve accommodating bore of the electric change over valve, said third channel portion extending from there to the pump accommodating bore by way of a fourth channel portion that is continued coaxially to the first portion of the first suction channel.

7. Hydraulic unit as claimed in claim 1, wherein the closure member is positioned in the portion of the transverse bore disposed between the valve accommodating bore and a second channel portion of the suction channel.

8. Hydraulic unit as claimed in claim 7, wherein the closure member is designed as a ball that is press-fitted into the channel bore from the direction of the braking pressure generator port.

9. Hydraulic unit for slip-controlled braking systems comprising:

an accommodating member for accommodating inlet and outlet valves in several valve accommodating bores of a first and a second valve row, said inlet and outlet valves opening into a first housing surface of the accommodating member that is disposed at right angles to a second housing surface into which several braking pressure generator ports open, a pump accommodating bore arranged in the accommodating member, wherein said pump accommodating bore is directed transversely to the direction the valve accommodating bores, wherein the valve accommodating bores for the outlet valves are arranged in the second valve row that is directly adjacent to the pump accommodating bore, a motor accommodating bore arranged in the accommodating member and directed vertically to the pump accommodating bore, an accumulator accommodating bore opening arranged in the accommodating member, wherein the accumulator member includes several pressure fluid channels that connect the accommodating bores for the valve, the pump and the accumulator, wherein the several pressure fluid channels enable a hydraulic communication between a braking pressure generator and several wheel brakes, wherein the inlet valves are arranged in the valve accommodating bores of the first valve row which is spatially separated from the second valve row accommodating the outlet valves by the pump accommodating bore, wherein several valve accommodating bores of a third valve row remote from the pump accommodating bore open directly between the second valve row and the braking pressure generator ports into the first housing surface of the accommodating member, an electric change over valve for effecting hydraulic communication between at least one braking pressure generator port and a suction-side connection of the pump accommodating bore wherein said electric change-over valve is closed in its basic position in at least one valve accommodating bore of the third valve row, wherein the hydraulic communication between said change-over valve and the pump accommodating bore is established by way of a portion of a suction channel, the length thereof being determined by the distance between the pump accommodating bore and the third valve row, wherein the valve accommodating bore provided for the electric change-over valve is configured as a blind-end bore that extends from the direction of the first housing surface to the bottom of the blind-end bore, and in that in the area of the bottom the suction channel is continued linearly until the braking pressure generator port, wherein a first and a fourth portion of the suction channel is produced by a drilling operation directed into the second housing surface, wherein said fourth portion of the suction channel extends up to the pump accommodating bore, wherein a second portion of the suction channel is produced by another drilling operation that is directed into a third housing surface disposed opposite the first housing surface, said second portion opening into the first portion of the suction channel produced by the first drilling operation, and wherein the second channel portion of the suction channel is interposed directly between the valve accommodating bore of the electric change-over valve and the braking pressure generator port.

10. Hydraulic unit as claimed in claim 9, further including a third channel portion that opens from the direction of the second housing surface into the valve accommodating bore electric change-over valve in parallel to the braking pressure generator port is introduced into the valve accommodating bore of the electric change-over valve, said third channel portion extending from there to the pump accommodating bore by way of a fourth channel portion that is continued coaxially to the first portion of the first suction channel.

* * * * *